United States Patent [19]

Hayakawa et al.

[11] 4,133,858

[45] Jan. 9, 1979

[54] INJECTION FOAM MOLDING PROCESS

[75] Inventors: Akifumi Hayakawa, Yokohama; Akira Aiba, Kawasaki; Eiki Orihara, Tokyo; Kiyoshi Fukushima, Fujisawa, all of Japan

[73] Assignee: USM Corporation, Farmington, Conn.

[21] Appl. No.: 860,317

[22] Filed: Dec. 14, 1977

[51] Int. Cl.² .............................................. B29D 27/00
[52] U.S. Cl. .................................... 264/54; 264/328; 264/DIG. 5; 264/DIG. 83; 425/817 R; 521/146
[58] Field of Search ............. 264/DIG. 83, 45.5, 328, 264/DIG. 5; 425/817 R, 4 R; 260/2.5 HB

[56] References Cited

U.S. PATENT DOCUMENTS

| | | | |
|---|---|---|---|
| 3,268,635 | 8/1966 | Kraus et al. | 264/DIG. 83 |
| 3,694,529 | 9/1972 | Josephsen et al. | 264/DIG. 83 |
| 3,960,996 | 6/1976 | Tonchev et al. | 264/DIG. 83 |
| 3,966,372 | 6/1976 | Yasulke et al. | 425/817 R X |

FOREIGN PATENT DOCUMENTS 2335310  2/1975  Fed. Rep. of Germany ... 264/DIG. 83

Primary Examiner—Philip Anderson
Attorney, Agent, or Firm—Benjamin C. Pollard; Richard B. Megley; Vincent A. White

[57] ABSTRACT

This invention relates to an improved injection foam molding method in which a foamable mixture of molten synthetic polymer resin and a chemical blowing agent in unfoamed condition is injected into a gas-pressurized expandable mold having a mold section movable for expanding the mold cavity to a position in which the surface of that section is in registry to the surface of another mold section, in which process the mold is filled under conditions resisting foaming of the material prior to filling of the mold and a novel controlled time sequence effective to form a fine mold crease line is employed in releasing the gas pressure and expanding the mold to allow foaming of the mixture into conformity with the mold surface.

3 Claims, 8 Drawing Figures

INJECTION FOAM MOLDING PROCESS

FIELD OF THE INVENTION

This invention relates to an improved injection foam molding method.

BACKGROUND OF THE INVENTION

The injection molding of foamed plastic articles is regularly practiced by the injection of a molten mixture of plastic and a blowing agent into a mold cavity having a mold surface member movable to enlarge the cavity after the material is injected to allow foaming and expansion of the injected material. Various procedures for such foam molding are disclosed in the U.S. Patent to Beyer et al. No. 3,058,161 of Oct. 16, 1962 and the U.S. Patent to Kyritsis et al. No. 3,801,686 of Apr. 2, 1974. In the procedure of the Beyer et al. patent, the foamable mixture is injected into an expandable mold and resin material adjacent the walls of the mold is solidified to form a thick nonfoamed layer before expanding the mold for foaming of interior portions of the resin in the mold.

The procedure of the Kyritsis et al. patent forms a mixture of resin and chemical blowing agent at a temperature below the foaming temperature and injects the mixture at a high rate through a flow resisting passage rapidly to heat it by viscous dissipation to foaming temperature and fill the mold with unfoamed resin material containing blowing agent during the induction period before development of bubbles from gas from the blowing agent. In this procedure, chemical blowing agent in the resin adjacent the mold walls is arrested by the cooling action of the mold walls to form a thin unfoamed skin and the mold is expanded directly on filling of the mold.

In such methods, it has been proposed to avoid the difficulty that unsightly surface areas develop at the expansion line where the surface members are moved to expand the mold, by use of a special form of mold shown in the U.S. patent to Kyritsis et al. No. 3,596,318 of Aug. 3, 1971. In that mold the surface member movable for expansion projects into the mold cavity at the time of injection and, to expand the mold cavity, is moved out so that its marginal portions are in register with marginal portions of another mold section leaving a mold a mold crease line in the plastic surface at the joint between the surface member and the other mold section.

It has also been proposed in British Patent to Ferrari No. 1,169,394 published Nov. 4, 1969, to resist premature foaming of a molten mixture of plastic and a blowing agent by pressurizing a sealed mold with air before injection of the mixture into the mold. When the mixture is injected, an overpressure valve prevents build up of high uncontrolled pressure, while the retained pressure is stated to ensure smooth glossy surfaces on the molded article. It was found, however, that simple pressurizing of the special form of mold above noted gave rise to unsatisfactory surfaces and mold crease lines.

BRIEF STATEMENT OF THE INVENTION

It is an object of the present invention to provide a method for molding foamed articles of heat softenable polymeric resin with superior surface character and freedom from unsightly molding joint or crease lines and having a fine cellular interior.

To these ends and in accordance with a feature of the present chemical blowing agent in unfoamed condition is injected into a gas pressurized expandable mold having a mold section movable for expansion to bring its surface into registry with the surface of another mold section, the gas pressure is released and the mold expanded in a controlled time sequence to form a fine mold crease line and allowing foaming of the mixture into full conformity with the mold surface.

DRAWINGS

Reference is made to the accompanying drawings forming part of the disclosure of the present invention and in which spacing between relatively movable parts of the apparatus is exaggerated for purposes of clarity and in which the size and relative proportions of surface irregularities and of the crease lines in the molded article are increased for emphasis. In the drawings.

DETAILED DESCRIPTION OF THE INVENTION

The present invention provides special pressure and time sequence controls to solve the special problem of assuring superior surface molding of synthetic polymer resins using a gas-pressurized expandable mold having a mold surface section movable into registry with another mold surface for expansion of the mold cavity. In the method a mixture of chemical blowing agent and a synthetic polymer resin is plasticated under conditions which prevent foaming and is injected in substantially unfoamed condition into a mold containing gas at relatively high pressure which is maintained at this value during injection. It is particularly important that the gas be released directly when the mold is filled, and that, as explained below, the movable mold section be operated to enlarge the mold cavity for expansion of the mixture promptly at the end of predetermined short time delay period after the pressurizing gas is released.

Figure 1:
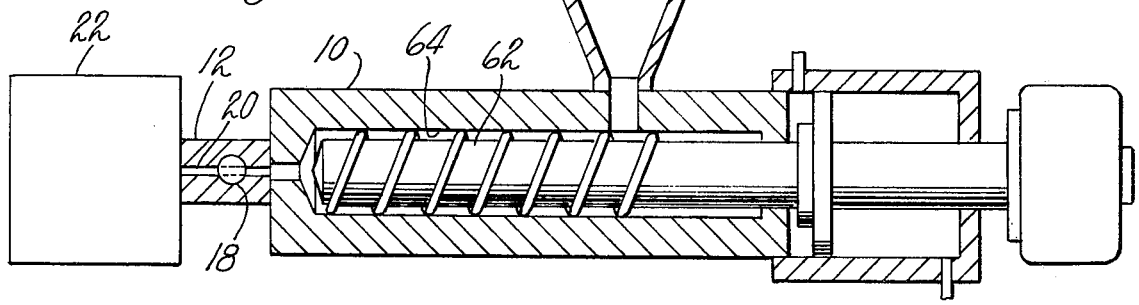
FIG. 1 is a diagrammatic elevational view with parts broken away of a screw type injection plasticator and mold.
Figure 2:
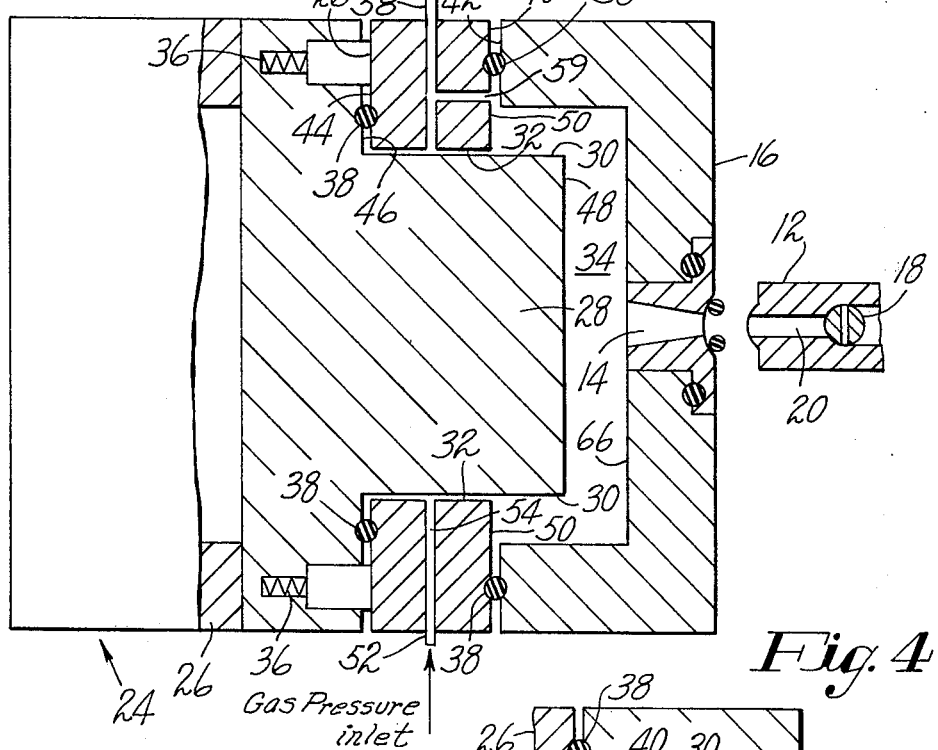
FIG. 2 is an elevational view on an enlarged scale with parts broken away showing the relationship of the parts of the mold and the provisions for pressurizing the mold.

An arrangement of apparatus (see FIGS. 1 and 2) useful in practicing the method of the present invention may include a plasticator shown as a screw type extruder 10 with its discharge nozzle in engagement with an inlet channel or sprue 14 through a stationary mold component 16. A discharge valve 18 in the nozzle passage 20 is kept shut to maintain pressure in the plasticator except during injection of plasticated mixture into the mold 22. A second mold component 24 for cooperation with the stationary mold component 16 to define a mold cavity has an outer member 26 for providing a portion of the molding surface of the component and an inner part 28 for providing a further portion of the molding surface of the component with its outer edges 30 in close slidable engagement with the inner edges 32 of the outer member 26. When the mold 22 is in closed, reduced volume, condition, the inner part protrudes through the outer member 26 into the mold cavity 34 and the outer member 26 is biased by springs 36 to maintain it pressed towards the stationary mold component 16. Sealing members, which may be O-rings 38, are disposed between the side portions 40 of the outer member 26 and the side portions 42 of the stationary mold component 16 and also, disposed between the side portions 44 of the outer member 26 and lateral extensions 46 of the inner part 28 to form gas tight joints.

For expansion, the inner part 28 is retracted a determined amount to withdraw the protruding portion and increase the volume of the mold cavity 34 and to bring the marginal portions of the molding surface 48 of the inner part 28 into registry with adjacent portions of the molding surface 50 of the outer member 26. The biasing springs 36 maintain the outer member 26 in sealing relation with the stationary mold component 16 during and after this movement until the mold is opened for removal of the molded part.

Gas for pressurizing the mold is supplied from a conduit 52 connected to a Channel 54 leading to the mold cavity. Relatively high gas pressure, usually about 15 Kg/cm$^2$ or higher, needed to prevent premature foaming of the foamable mixture of synthetic polymeric resin and chemical blowing agent is supplied through the conduit 52 prior to injection of the mixture. A relief valve 56 is connected to a gas discharge channel 58 and mold vent 59 to allow controlled escape of gas during injection to avoid undesirable temperature increase from rapid compression of the gas in the mold cavity 34, and a gas discharge valve 60 also connected to channel 58 is provided to reduce gas pressure to atmospheric when injection is complete. Any gas such as nitrogen or air which does not attack the molding material or the mold may be used for pressurizing.

Any of the heat softenable organic polymeric resinous materials commonly processed by injection molding to form foamed articles may be treated according to the present process. That is, any polymer resin composition that has the heat stability at the temperature needed to bring it to fluid state with a viscosity suitable for injection molding, and the ability to set up to a solid state after molding and cooling, can be foam molded by the present process. Among such resins are polyethylenes, polypropylenes, ethylenepropylene copolymers, ethylenevinyl acetate copolymers, polystyrenes including "impact" polystyrenes, polyamides, polyacetals, polycarbonates, polymers of vinyl chloride, copolymers of vinyl chloride with other monomers such as styrene, resins such as ethyl cellulose, copolymers of acrylonitrile with other monomers such as styrene, polyurethanes, natural rubbers, synthetic polymer rubbers such as, copolymers of butadiene and styrene, terpolymers of butadiene, styrene and acrylonitrile, polyester, polyphenyleneoxides, "A stage" phenolic resins and epoxy resins, and other materials.

The present method employs chemical blowing agents, that is agents which generate gas by chemical decomposition or reaction, rather than by volatilization of a liquid as the primary source of blowing gas because of their greater pressure development. Chemical blowing agents must be matched to the processing characteristics of the polymer resin to be foamed in accordance with known principles, The temperature range for foaming is that at which the viscosity of the molten resin is high enough to retain the liberated gas but not so high as to unduly restrict expansion. Low temperature decomposing blowing agents must be used with low temperature processing polymers, since such agents would reach the foaming temperature in the plasticator and develop undesired amounts of gas which would form coarse cells and poor molded part surface finish if used with high temperature processing polymer. Conversely, high temperature decomposing blowing agents if used with low temperature processing polymers, will give unblown or inadequately blown products. Useful blowing include the following, with the numbers in brackets being the decomposition temperatures of the blowing agents in air: P,p'-oxybis (benzene sulfonyl hydrazine) (315°–320° F.) azodicarbonamide (385°–390° F.), p-toluene sulfonyl semicarbazide (455°–460° F.), trihydrazinotriazine (525° F.), "AZO-CW"-hydrazine derivative (410° F.) and modified trihydrazinotriazine from Fisons, England, in styrene acrylonitrile copolymers (480° F.).

Plastication of the mixture of resin and blowing agent is effected by action of the screw 62 in the barrel 64 of the extruder 10 to raise the temperature of the mixture and cause it to become molten. The temperature reached in the plasticator is controlled at a value such that the temperature of the material in the barrel 64 of the extruder, plus any temperature rise from frictional resistance in passing through the nozzle passage 20 and inlet channel or sprue 14, is such that the material enters the mold cavity 34 at foaming temperature. As used herein, the term "foaming temperature" means that predetermined range of temperature for a particular combination of organic polymeric material and blowing agent at which the foaming process will produce a foam structure having a desired or preferred character. If expansion takes place above the predetermined foaming temperature, the cells in the first position of the material entering the mold will be too large (and may even burst) and the molded article will have uneven cell size, internal voids and poor surface finish. If expansion takes place below the predetermined foaming temperature, unsatisfactory mold filling, the inadequate or incomplete blowing will result.

Figure 3:
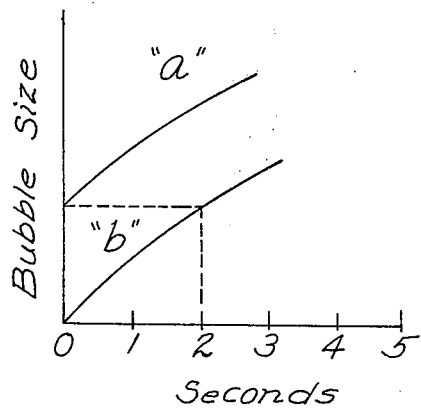
FIG. 3 is an idealized graph contrasting the effects of a pressurized mold and a nonpressurized mold on the rate of bubble growth in an injected foamable mixture.

In order to resist foaming at the free surfaces of resin by gas present in the resin at the time it is injected into a mold or gas developed before the mold is filled, relatively high gas pressure of over 10 Kg/cm$^2$ and preferably at least 15 Kg/cm$^2$, is employed in the mold during injection. This high gas pressure also acts to maintain blowing gas in solution in the resin and is believed to reduce the rate at which bubbles of blowing gas can grow relative to the rate of growth at atmospheric pressure. As illustrated in FIG. 3 the diameters of bubbles in a foamable mixture discharged from a plasticator 10 to a mold 22 at atmospheric pressure are believed to increase along a curve "a" while the diameters of bubbles in a foamable mixture discharged from plasticator 10 to a mold 22 under gas pressure would, (as indicated in Curve "b"), at the end of 2 seconds delay, only have reached the diameter at which the bubbles started in Curve "a".

A further factor which may affect development of expansion force arises when the injection procedure includes the injection at a high rate through a restricted passage of a molten mixture containing undecomposed blowing agent to generate heat to raise the mixture to foaming temperature. In this case, the induction period for decomposition of the blowing agent is a factor, but this may be largely offset by the nucleating action of blowing agent particles.

Whether or not the explanation of the action of gas pressure in delaying bubble development within the mold is correct, development of expansion force in the mixture of resin and blowing agent is delayed by maintaining gas pressure on the mold, and discharged of the pressurizing gas promptly after the mold is filled is important to allow the gas bubbles to grow and expansion force to develope as rapidly as possible and to allow the expanding resin to sequeeze out any gas trapped between the resin and the mold surfaces 48 and 50 of the outer and inner mold parts or the mold surface 66 of the stationary mold component.

Figure 4:
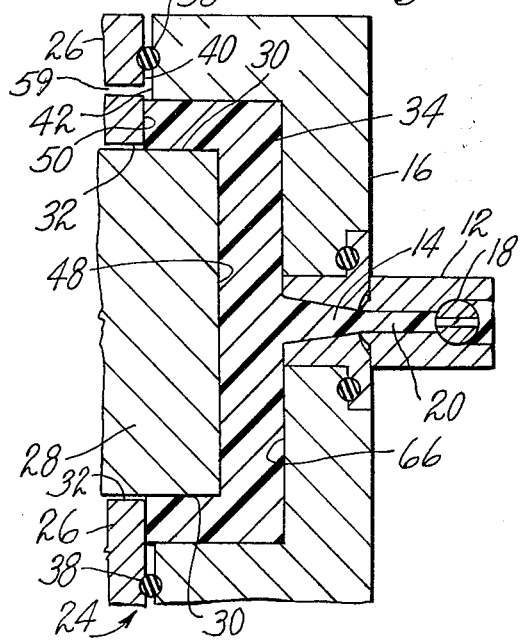
FIG. 4 is an elevational view with parts broken away showing the state of foamable mixture in an expandable mold directly after injection.
Figure 5:
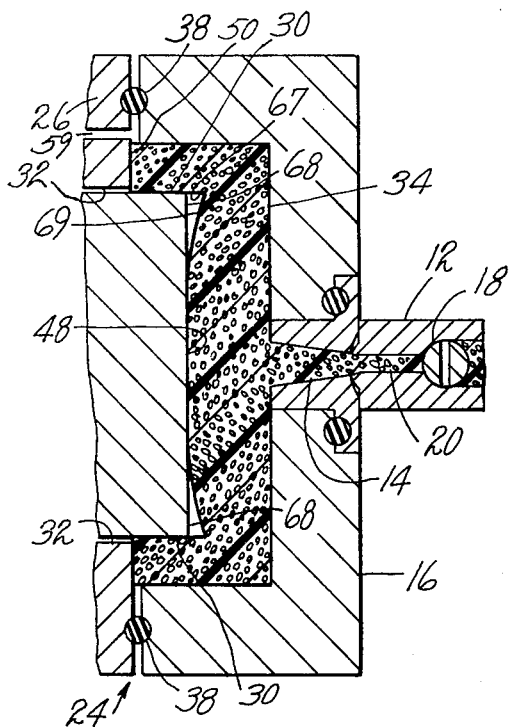
FIG. 5 is an elevational view comparable to FIG. 4, but showing the state of the foamable mixture when the mold is partially expanded.
Figure 6:
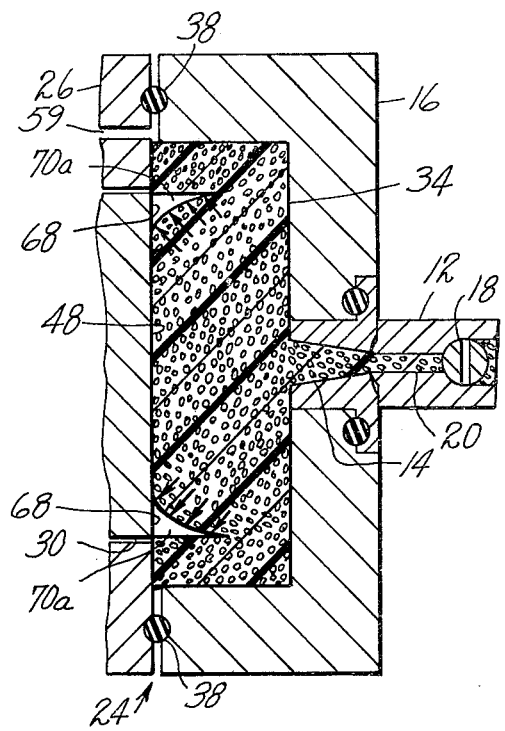
FIG. 6 is a view comparable to FIGS. 4 and 5, showing the condition of the foamable mixture in the mold when the mold has reached full expansion.
Figure 7:
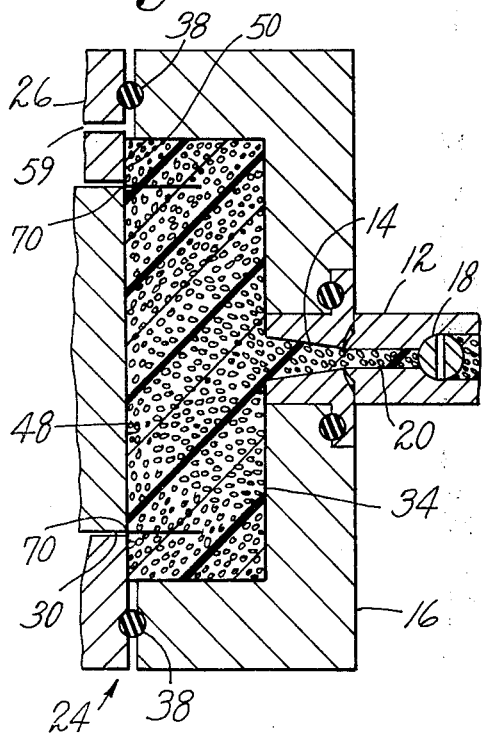
FIG. 7 is a view comparable to FIGS. 4 through 6 showing the mold in fully expanded condition and indicating the tight mold crease line obtained following the method of the present invention.
Figure 8:
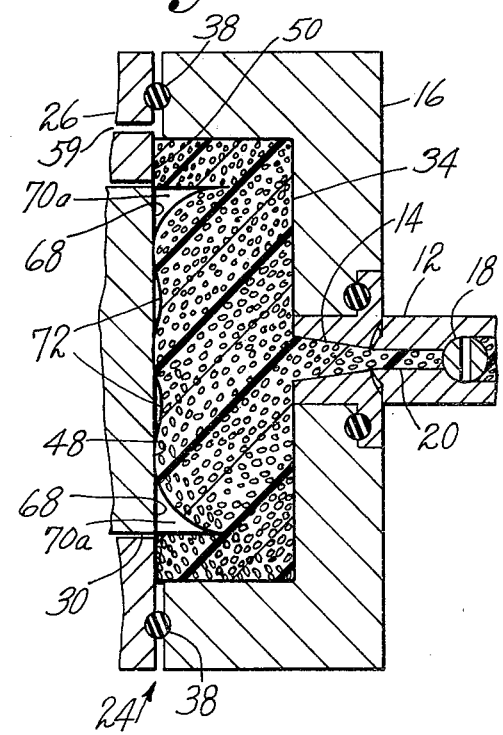
FIG. 8 is a view comparable to FIG. 7 showing the condition of the foamable material where the method of the present invention is not followed.

The timing of expansion of the mold after mold filling and release of gas pressure is an important factor in the present method. Movement of the mold surface 48 of the inner mold part 28 into register with the mold surface 50 of the outer mold member 26 to expand the mold cavity is preferably effected promptly after a controlled time delay period for the build up of expansion force, which is inhibited by the gas pressure in the mold, to a level at which it will press all portions of the plastic into molding engagement with the moving mold surface 48. Ordinarily, this time delay period is of the order of about 3 seconds; but higher or lower viscosity of the molten resin may require small variations from this time. The importance of of this timing can be understood better by reference to FIGS. 4 to 7. As shown in FIG. 4, before expansion, the resin is in over all contact with the mold surfaces 48, 50, and 66 where it is cooled and becomes a soft semi-solid layer or skin of thickened partially gelled resin. FIG. 5 shows the movable inner mold part 28 at an intermediate position in the expanding of the mold, and illustrates that the cooled skin material 67 formed on the side edge 30 of the mold part 68 remains in its original shape as the side edge 30 slides past it, but that the skin 69 formed on marginal portions 68 of the movable mold surface 48 has pulled away along a curve. FIG. 6 shows a fully expanded mold with arrows indicating the action of foaming pressure in the resin material in stretching the skin 69 and pressing it toward the skin portion 67. In order to reach the tight crease line 70 shown in FIG. 7, the skin 69 in this marginal portion must be sufficiently soft and flexible and the expansion force must be sufficient to stretch the skin to bring it back into engagement with the surface 48 of the movable inner mold part 28 and press it close to the skin 67 formed on the side edge 30 of the inner mold part 28 to form a fine crease line 70. Expansion of the mold before the end of the necessary time delay period to allow build up in expansion force gives an irregular incompletely closed crease line 70A and undesirable sinks in the main surface of the molded article as shown in FIG. 8. Failure to expand the mold promptly at the end of this time period the skin, a wavy surface and a broad crease line in the molded article.

If the foamable mixture were at a higher temperature, foaming pressure would develop faster and material aginst the mold stay soft longer. However, there would be greater tendency to premature foaming, possibly even in the barrel, coarser cells in the interior, longer cooling time before removal and greater tendency to develop sink marks. Lower viscosity due to the higher temperature may cause uneven cell development and diffusion of gas to external surfaces with loss of gloss and development of sink marks.

If the foamable mixture were at too low a temperature, there might be no time during which, after the expansion force of the mixture in the mold surfaces during mold cavity expansion, the mixture would still have softness and flexibility of the material cooled by the mold surfaces sufficient for closing of the crease line.

Increase in the amount of blowing agent may also increase the speed of development of the required expansion force, but may create other problems such as after blow.

Control of the process, therefore, includes (A) a selection of temperature at which (1) a particular foamable mixture is injected into the mold within the range giving desirable cellular structure and superior surface, and (2) there is a useful length of time after completing injection and release of gas pressure in the mold between the development of adequate expansion force on the one hand and excessive stiffening of material on the other; and (B) expansion of the mold promptly at the end of the controlled time delay period so that the desired expansion force and skin softness will coexist to the extent needed to enable the required sealing of the mold crease line and conformation of the surface of the resin to the area of mold adjacent to the joint between movable mold surface and the mold surface to which it has been moved in registry.

The following examples are given to aid in understanding the invention and it is to be understood that the invention is not limited to the particular materials, procedures, or conditions given in the examples.

EXAMPLE 1

A foam molding mixture was prepared comprising 70 parts by weight of general purpose polystyrene having a Vicat Softening Point of 97° C. and a Melt Flow Index by ASTM Method 01238 of 8.5 g/10 min., 30 parts by weight of a high impact graft copolymer of styrene and rubber having a Melt Flow Index of 3.0 g/10 min., 0.3% of azodicarbonamide blowing agent and 0.05% of zinc stearate. The mixture was plasticated in a screw type injection molding extruder operating with a nozzle, valve and barrel forward position temperature of 190° C., a center barrel temperature of 180° C. and a rear barrel temperature of 170° C., and was injected at an injection pressure of 1000 Kg/cm$^2$ and a maximum injection speed into a nitrogen gas pressurized mold having the structure shown in FIG. 2.

The mold temperature was 20° C. at the time of injection and the pressure of nitrogen in the mold cavity was 15 Kg/cm$^2$ at the beginning of injection. Filling of the mold displaced gas through the relief valve which maintained the pressure at approximately 15 Kg/cm$^2$ until the mold was filled.

When the injection stroke was complete, a limit switch was actuated to complete a circuit to open the gas pressure discharge valve so that gas pressure in the mold fell to atmospheric pressure directly when the mold was filled. At the same time that the discharge valve was opened, a timer was started which after a delay of 3 seconds initiated movement of the mold part to increase the volume of the mold cavity and allow the material in the mold cavity to expand. The initial spacing of the mold part from the opposing mold surface was 7 mm and the movement of the mold part for expansion was 6 mm.

The mold was opened after a curing time of 120 seconds, and, after removal, the molded article found to have a smooth, glossy surface free from spray and bubbles. The crease line was well closed and no sink marks were observed.

EXAMPLE 2

The procedure of Example 1 was repeated, with the exception that the gas pressure discharge valve was not opened until just before mold cavity expansion. In this case, the crease line was not well closed but had a profile such as shown in FIG. 8. Also, sink marks were evident.

EXAMPLE 3

The procedure of Example 1 was repeated with the exception that the mold cavity was expanded promptly, that is in about one second after release of gas pressure on the mold. In this case, the molded article had undesirable sinks in the surface adjacent the movable mold part and an irregular crease line.

We claim:

1. In an injection foam molding process including the steps of forming a molten mixture of heat fusible synthetic polymeric resin and a compound chemically decomposable by heat to form gas as blowing agent, injecting said mixture into the cavity of a mold under conditions that the mold cavity is filled with the mixture at foaming temperature, said mold having a first section which protrudes into the mold cavity at the time of injection and which has a surface portion and side edges, said side edges having portions initially exposed within the mold cavity and which are in sliding engagement with side edges of another mold section to form a tight joint, said first mold section being movable to bring said surface portion into registry with a mold surface portion of said other mold section to increase the volume of the mold cavity, moving said first mold section to increase the volume of the mold cavity to permit the mixture to foam and solidifying the mixture, the improvement which comprises sealing the mold, supplying gas to the mold cavity to develop a gas pressure of at least about 10 Kg/cm$^2$ to resist foaming of the molten mixture injected into the mold, injecting the molten mixture into the mold under conditions which fill the mold cavity with the mixture in substantially unfoamed condition, discharging gas from said cavity during said injection at a rate to avoid burning of said resin by gas compression temperature increase but not to lower the pressure below said foam resisting pressure, reducing the gas pressure substantially to atmospheric pressure substantially immediately when said mold cavity is filled and thereafter moving said first mold section to increase the volume of the mold cavity during the time interval in which A. thickened resin on marginal portions of the protruding mold surface portion adjacent the joint between the mold sections remains soft, deformable and extensible by the expansion force of the blowing agent, and B. the expansion force of said blowing agent has reached a value to force said resin against the moving wall and to extend portions of thickened resin on said marginal portions of said movable mold surface adjacent said joint between mold sections into close proximity to resin cooled on said side edges to form a narrow crease line.

2. The improved injection foam molding process as defined in claim 1 in which gas pressure in the mold cavity before and during injection is at least about 15 Kg/cm$^2$ and the time at which said mold surface member starts to move to increase the volume of said mold cavity is about 3 seconds.

3. The improved injection foam molding process as defined in claim 1 in which the mixture of resin and blowing agent is below foaming temperature before injection and flow resistance of the passage to the mold cavity supplies the increment of heat to bring the temperature of the mixture to foaming temperature as it enters the mold cavity.

* * * * *